3,166,002
HOT BEVERAGE PROCESSING MACHINE
William Danziger, Malverne, Charles D. Rush, Stony Brook, and Joseph Gold, Old Bethpage, N.Y., assignors to Continental Vending Machine Corp., Westbury, N.Y., a corporation of New York
Original application Dec. 2, 1957, Ser. No. 700,005, now Patent No. 3,045,870, dated July 24, 1962. Divided and this application July 2, 1962, Ser. No. 206,706
4 Claims. (Cl. 99—289)

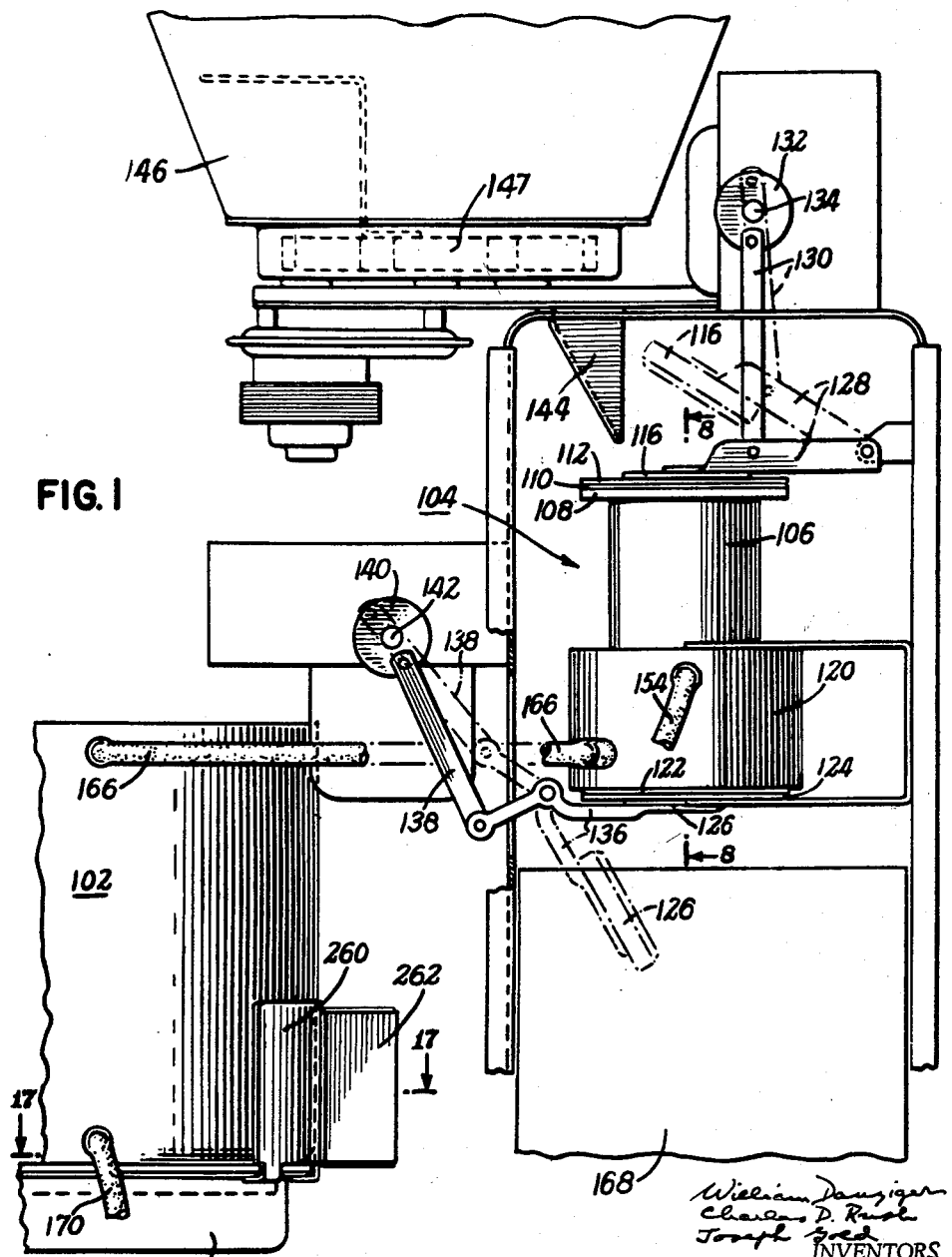

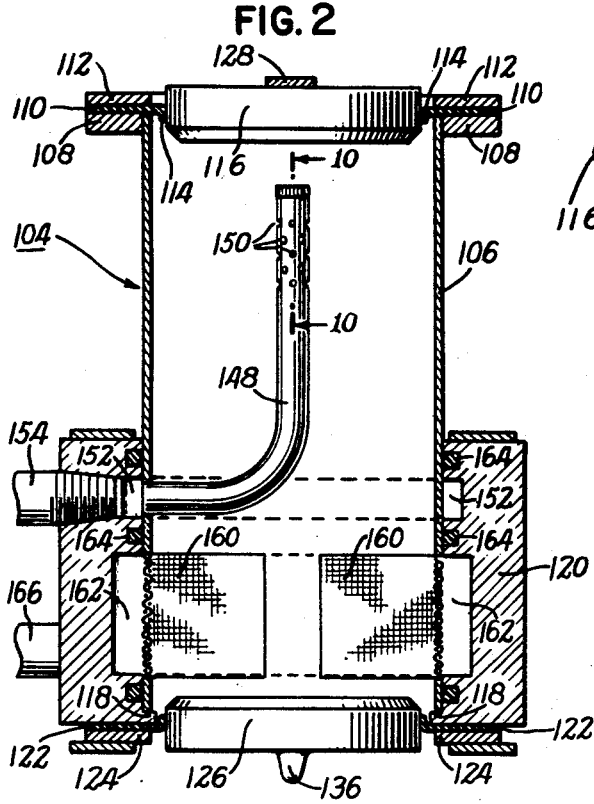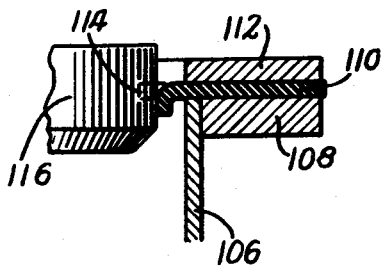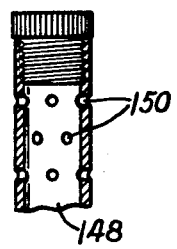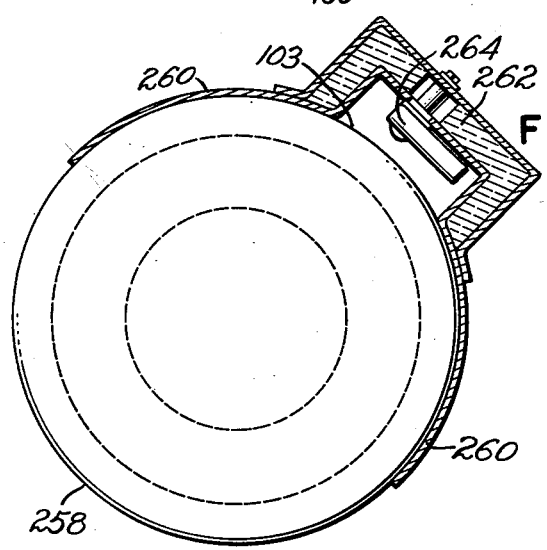

The present invention relates to hot beverage processing apparatus, particularly for use in a coin-operated vending machine of the type which dispenses coffee, tea, hot chocolate, soup and other hot beverages.

This application is a division of our co-pending patent application Serial No. 700,005, filed December 2, 1957, now Patent No. 3,045,870.

To assure that there always is fresh coffee available, the dispensing machine should include an automatic brew unit arranged to produce a relatively small amount of coffee at frequent intervals in accordance with the demand. To prevent leakage and faulty operation, the interior of this unit should be tightly sealed from atmosphere during the brewing operation. However, because the brew unit must be cleaned and then recharged with granular coffee between each brewing operation, means must be provided for obtaining access to the interior of the unit, and these means advantageously should be operable in a simple manner by the usual automatic timing mechanism. In accordance with another aspect of the present invention, this problem is solved by a unique closure and sealing arrangement which is economical to manufacture and reliable in operation.

It is an object of this invention to provide a coffee dispensing machine having a coffee brew unit that is simple in construction and especially adapted for trouble-free operation over a long period of time.

Other objects and advantages of the invention will in part be pointed out in, and in part apparent from, the following description considered together with the accompanying drawings, in which:

FIGURE 1 is a detailed view showing the elements of the coffee brewing equipment herein described and claimed;

FIGURE 2 is a cross-section view taken along line 2—2 of FIGURE 1, showing the interior of the coffee brew unit;

FIGURE 3 is an enlarged view of the closure seal for the coffee brew unit;

FIGURE 4 is a detail section taken along line 4—4 of FIGURE 2, showing the upper end of the hot water spray pipe;

FIGURE 5 is a horizontal section taken along line 5—5 of FIGURE 1, showing particularly the thermostatic sensing element for maintaining the coffee in the storage tank at a constant temperature.

Referring now to the details of the invention as disclosed in the drawing, the fresh liquid coffee to be dispensed is stored in a coffee storage tank 102 having a capacity of 24 cups. When the coffee in this tank drops to a level where only 12 cups remain, an automatic brewing cycle is initiated by the usual means, not shown, to brew an additional 12 cups of fresh coffee and to transfer this coffee to the storage tank. This coffee is produced in a coffee brew unit 104 now to be described.

Referring now to FIGURES 1 through 4, the brew unit 104 comprises a tank in the form of a cylindrical tube 106 having an external flange 108 secured to its upper end. Seated on this flange is a flexible rubber washer 110 held in place by a clamp ring 112 screwed to the flange. The inner diameter of the washer is smaller than the tube diameter so that the washer forms a resilient lip 114 extending inwardly around the entire periphery of the open end of the tube, as indicated in dashed outline in FIGURE 3.

Movable into and out of the open end of this tube 106 is a top closure plate 116 which is circular and has a diameter larger than the aperture formed by the washer. Thus, when the closure plate is moved downwardly into the tube end as shown in FIGURE 2, it deforms the washer lip 114 towards the interior of the tube to provide a pressure-resistant, liquid-tight seal. A special advantage of this arrangement is that it does not require close mechanical tolerances; that is, normal variations in lateral or vertical positioning of the closure plate do not have any important effect on the quality of the seal.

The lower end of the tube 106 rests on an interior shoulder 118 forming part of a cylindrical base member 120, so that the tube is readily removable from this base member for cleaning or repair. A second rubber washer 122 is secured to the bottom of the base 120 by means of another clamping ring 124, and this latter washer serves to form a liquid-tight seal (as described above with reference to the first washer 110) with a bottom closure plate 126.

The top closure plate 116 is moved relative to the tube 106 by a pivoted arm 128 (FIGURE 1) which is actuated by a link 130 pinned eccentrically to a disc 132. This disc is rotated by a shaft 134 the drive motor for which is controlled by the usual brew-cycle timer (not shown). The bottom closure plate 126 is operated by a bell crank 136 which is actuated by another link 138 pinned eccentrically to a second disc 140. This latter disc is rotated by a shaft 142 the drive motor for which also is controlled by the brew-cycle timer.

At the start of a brewing cycle, the top of the brew unit 104 is opened and a fixed quantity (ordinarily one-quarter pound) of granular coffee is dropped into the tube 106 by a coffee chute 144 extending down from a coffee hopper 146. (For this purpose, the coffee hopper is provided with a slotted disc 147.) The top closure plate 116 then is moved down into seal position and (referring again to FIGURE 2) hot water is fed into the interior of the brew unit through a curved spray pipe 148 which is formed at its upper end with perforations 150 to direct the hot water onto all portions of the granular coffee charge.

The lower end of this spray pipe 148 is integrally secured to the wall of the tube 106, and communicates through an aperture in this wall with an annular water inlet groove 152 formed in the base 120. This groove in turn is connected by a pipe to a hot water supply tank 156 which maintains a supply of water at a temperature of about 200° F. and a pressure of about 15 p.s.i. A valve 158 in this latter pipe is controlled by the brew-cycle timer so as to cause hot water to flow into the brew unit 104 for a predetermined time (normally about 2 minutes) at a rate sufficient to provide 12 cups of coffee during this period.

While the hot water is entering the brew unit 104, the pressure in the tube 106 (normally about 5 p.s.i.) is sufficient to produce a substantial force tending to move the closure plates 116 and 126 away from the tube. However, the closure plates are positively held in place by the links 130 and 138 which are aligned with the axes of the corresponding shafts 134 and 142 so as to provide the required reactive force without any need for energizing the motors which drive these shafts. The only flexible region exposed to the internal tube pressure is the small area represented by the washer lip 114, and the seal produced by the deformation of this lip is well adapted to prevent leakage.

The liquid coffee produced by the incoming hot water is forced out of the brew unit 104 through screened apertures 160 formed in the wall of the tube 106. These apertures communicate with an annular coffee outlet groove 162 formed in the base 120 immediately beneath the inlet groove 152, the two grooves being sealed by three O-rings 164 which press against the side wall of the tube. The coffee is fed from the outlet groove to the coffee storage tank 102 by means of a coffee hose 166.

With these annular grooves 152 and 162, it is unnecessary to position the base 120 relative to the tube 106 or to position said tube relative to the base 120, said positioning being angular, that is, about the longitudinal axis of tube 106. Thus, the tube and spray pipe 148 may be removed for cleaning and then replaced in a short time without difficulty.

After the required amount of coffee has been brewed and passed to the storage tank 102, the bottom closure plate 126 is moved downwards and away (as shown in dashed outline in FIGURE 1) to permit the used coffee grounds to drop into a waste container 168 immediately beneath. At the same time, the brew-cycle timer actuates another valve (not shown) in the hot water pipe 154 leading to the brew unit spray pipe 148 so as to direct a heavy stream of hot water into the tube for several seconds and thus flush out any remaining coffee particles. Subsequently, the bottom closure plate is returned to its seal position and the brew unit 104 is ready for another brewing operation when required.

Referring now to FIGURES 1 and 4, the coffee storage tank 102 is mounted on a pedestal 258 which is permanently secured to the cabinet of the machine. Thus, the tank may readily be removed from the cabinet for cleaning and servicing. The coffee in the tank is heated by a conventional electrical heating unit (not shown) in the pedestal. The rear and right-hand side (referring to FIGURE 1) of the tank 102 abut a semi-cylindrical support wall 260 which conforms to the contours of the tank and is fixedly secured to the pedestal.

The temperature of the coffee in the tank 102 is maintained constant by thermostatic control of the electrical current supplied to the heating unit in the pedestal 258. For this purpose, there is secured to the support wall 260 a U-shaped thermal insulation shield 262 carrying an adjustable temperature-sensitive bi-metallic element 264 of usual construction. This element is connected in the electrical circuit which energizes the pedestal heating unit, and operates to turn this unit off and on in response to changes in the coffee temperature as represented by the heat radiated or conducted to the element 264 from the exposed side 103 of the storage tank 102. It has been found that this temperature control arrangement very effectively maintains the coffee temperature constant, and is particularly advantageous in that it permits the coffee storage tank 102 to be removed, when required, without the need for disconnecting the wires leading to the heating unit or the bi-metallic element 264.

Although a preferred embodiment of the invention has been set forth in detail, it is desired to emphasize that this is not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

What is claimed is:

1. In a coffee dispensing machine, apparatus for brewing coffee comprising, in combination, a base member having a vertical cylindrical bore therein, a cylindrical tube positioned in said bore and supported by said base member, first and second movable closure means connected to said base member and operable to seal the top and bottom ends of said tube, a flexible washer secured to said tube around the top end thereof to cooperate with said first closure means for sealing said tube, a spray pipe within said tube for spraying hot water onto granular coffee therein, said spray pipe being attached to the wall of said tube to permit said tube and said spray pipe to be removed from said base member as a unit, the wall of said tube being apertured at the point of attachment of said spray pipe thereto to allow the flow of water into said spray pipe, and conduit means forming a part of said base member and communicating with the aperture in said tube wall for feeding hot water into said spray pipe.

2. In a coffee dispensing machine, apparatus for brewing the coffee comprising, in combination, a cylindrical tube open at both ends to permit the passage of coffee components into and out of said tube, first and second circular closure plates insertable into said tube ends, the diameters of said plates being slightly smaller than the inner diameter of said tube, means external of said tube for shifting said closure plates into said tube ends with the planes of said plates perpendicular to the tube axis, and first and second washers of flexible material positioned at the ends of said tube and coaxially therewith, the inner diameters of said washers being slightly smaller than the diameters of said closure plates whereby the insertion of said plates into the ends of said tube deforms said washers towards the interior of said tube to provide liquid-tight seals.

3. In a coffee dispensing machine, apparatus for brewing the coffee comprising, in combination, a base member having a cylindrical bore therein, a tube positioned in said bore and having an opening at one end thereof for the passage of coffee components into said tube, closure means operable to seal said one tube end during a brewing operation, the wall of said tube being formed with a first aperture for the flow of hot water into said tube and a second aperture for the flow of liquid coffee out of said tube, said base member being provided with first and second annular grooves extending around said bore and communicating with said apertures respectively, conduit means for supplying hot water to said first annular groove, and outlet means for carrying liquid coffee from said second annular groove.

4. In a coffee dispensing machine, apparatus for brewing the coffee comprising, in combination, means for sealing one end of said tube, a rigid closure plate insertable into the other end of a said tube, said closure plate being slightly smaller than said tube, a thin lip of flexible material protruding laterally into the opening at said other end of said tube and around the entire periphery thereof to form an aperture slightly smaller than said closure plate so that the insertion of said plate into said opening deforms said lip towards the interior of said tube to provide a liquid-tight seal, a link for shifting said closure plate into and out of said tube, and a drive shaft for operating said link, said link being pivotally secured to said shaft at an eccentric point and arranged to be aligned with the axis of said shaft when said closure plate is seated in position in said tube, whereby said link positively locks said closure plate in position during a brewing operation.

References Cited in the file of this patent

UNITED STATES PATENTS

| | | |
|---|---|---|
| 2,593,712 | Wells | Apr. 22, 1952 |
| 2,895,402 | Totten | July 21, 1959 |
| 2,907,266 | Moulden | Oct. 6, 1959 |
| 2,971,672 | Price | Feb. 14, 1961 |

FOREIGN PATENTS

| | | |
|---|---|---|
| 578,062 | Great Britain | June 13, 1946 |